United States Patent [19]
Cittadini et al.

[11] Patent Number: 6,117,265
[45] Date of Patent: Sep. 12, 2000

[54] METHOD AND APPARATUS FOR HEAT-WELDING LENGTHS OF PROFILES FOR SEALING GASKETS

[75] Inventors: Paolo Cittadini, Luvinate-Varese; Umberto Lovison, Brebbia-Varese, both of Italy

[73] Assignee: Industrie Ilpea S.p.A., Malgesso-Varese, Italy

[21] Appl. No.: 09/147,121

[22] PCT Filed: Apr. 25, 1996

[86] PCT No.: PCT/EP96/01742
§ 371 Date: Oct. 13, 1998
§ 102(e) Date: Oct. 13, 1998

[87] PCT Pub. No.: WO97/40974
PCT Pub. Date: Nov. 6, 1997

[51] Int. Cl.$^7$ .................................................. B29C 65/18
[52] U.S. Cl. .................. 156/258; 156/287; 156/304.6; 156/309.9; 156/358; 156/499; 156/517; 156/556; 425/108; 277/314; 49/479.1; 49/495.1
[58] Field of Search .................................. 156/159, 503, 156/158, 258, 308.4, 309.9, 517, 558, 559, 287, 499, 304.6, 556, 358; 277/632, 650, 314; 269/152; 49/479.1, 495.1; 425/108

[56] References Cited

U.S. PATENT DOCUMENTS

| | | | |
|---|---|---|---|
| 1,364,362 | 1/1921 | Fetter | 264/325 |
| 2,021,983 | 11/1935 | Cavanagh | 156/503 |
| 2,278,756 | 4/1942 | Wright | 156/228 |
| 2,364,962 | 12/1944 | Eagles | 264/152 |
| 2,503,882 | 4/1950 | Medford | 156/155 |
| 3,253,972 | 5/1966 | Huddleston | 156/304.2 |
| 3,859,408 | 1/1975 | Voss et al. | 264/506 |
| 5,332,204 | 7/1994 | Puppin | 269/21 |
| 5,614,052 | 3/1997 | Fisher | 156/304.2 |

FOREIGN PATENT DOCUMENTS

| | | |
|---|---|---|
| 0 313732 | 3/1989 | European Pat. Off. . |
| 26 33141 | 1/1978 | Germany . |
| 41 35360 | 4/1993 | Germany . |
| 2-88220 | 3/1990 | Japan . |
| 4-168033 | 6/1992 | Japan . |

Primary Examiner—Linda L. Gray
Attorney, Agent, or Firm—Oblon, Spivak, McClelland, Maier & Neustadt, P.C.

[57] ABSTRACT

A method and apparatus for heat-welding corners lengths of profiles together, for sealing gaskets, where the profiles include at least one extendible or compressible air chamber and are cut at their ends at an angle. The method includes positioning two profiles, with one of the cut ends of each profile opposite each other inside a suitable device including clamps which make the positioning possible, heating the positioned ends until the positioned ends reach a softened state, choking the profiles so as to completely occlude the air chambers along choking sections, closing the clamps in order to cause the profiles to come into mutual mating contact at the heated ends, injecting air into the air chambers by perforating the air chambers in a region between the choking sections and the heated ends so as to apply pressure to walls of the profiles in that region, pressing the walls against walls of the clamps to join the heated ends by heat-welding under pressure, and opening the occluded sections. The apparatus includes a heating element to heat one of the ends of each profiles, clamps to position the profiles with the cut ends opposite each other and for mutually mating the heated ends together, needles for injecting air inside an interior of the air chambers nearby the ends to be heat-welded, and devices to choke the profiles by completely occluding said air chambers along choking sections.

6 Claims, 2 Drawing Sheets

METHOD AND APPARATUS FOR HEAT-WELDING LENGTHS OF PROFILES FOR SEALING GASKETS

Gaskets for refrigerators made from such materials as PVC which are constituted by a base element designed to be fastened onto refrigerator door, an intermediate bellows-like chamber which secures the extension or compression motions and a seat designed to house magnetized material which realizes the tight shutting of refrigerator door by cooperating with metal edge of the refrigerator cabinet, are well known.

Such gaskets are extruded as straight profiles which are then cut into lengths according to the size of the refrigerator cabinet to which they must be applied. Said extruded profiles are cut at their ends according to an angle of 45°, and at these ends the so prepared lengths of profile are then joined by heat-welding in order to produce ready frames for application to the refrigerator cabinet.

SUMMARY

In general, the purpose of the method proposed by the present invention is of providing very strong heat-welded joints at the junction zones.

In order to achieve said purpose and to provide other advantages which will be clearer from the following disclosure, the present invention proposes a method for heat-welding, at the corners, lengths of profiles for sealing gaskets, for example for refrigerators of the like, of the type comprising at least one bellows-like extendible, or compressible, air chamber, with said lengths of profile being cut at their ends according to angles of 45°, characterized in that said method comprises the following steps:

a) positioning two lengths of profile with their ends opposite to each other, inside a suitable device comprising clamps which make it possible said positioning to be performed, b) heating said ends, cut according to suitable angle until said ends of both lengths of profile reach a softened state, c) choking each of said lengths of profile nearby said ends so as to completely occlude said air chamber along the choking section, closing said clamps in order to cause said pair of lengths of profile to come into mutual mating contact at their heated ends, while simultaneously injecting air into the interior of said air chamber by perforating it the region comprised between said choking section and the said end of each of said lengths of profile, so as to press the walls of the lengths of profile in that region against the walls of the clamps, thus heat-welding said ends to each other under pressure, d) opening said occluded sections and e) heat-welding a free end of the so heat-welded pair of lengths of profile with a third length of profile by acting in a similar way, and finally with the fourth, and last, length of profile, so as to form a gasket frame heat-welded at its corners.

BRIEF DESCRIPTION

In order to better understand characteristics and advantages of the method according to the present invention, an exemplifying embodiment thereof is reported by referring to the figures of the accompanying drawings. In no way such an example should be understood as being limitative of the scope of the invention.

Figure 1:
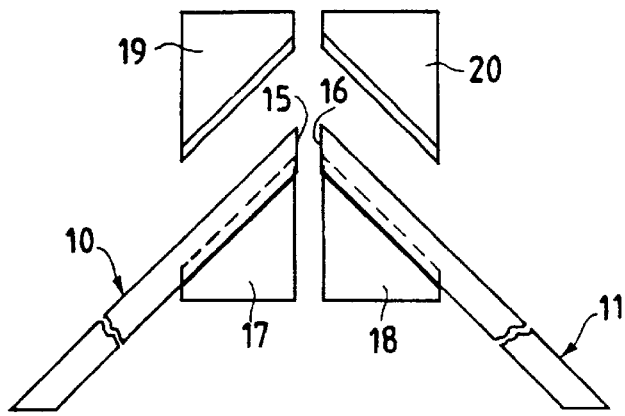
FIGS. 1–5 show five sequential consecutive steps of the method according to the present invention.
Figure 7:
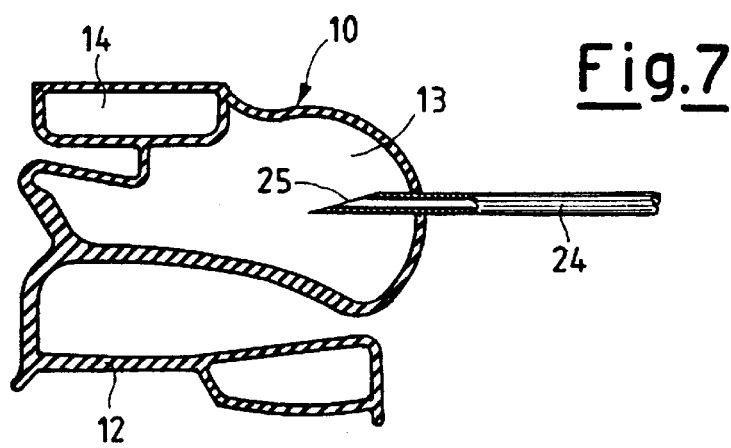
FIG. 7 shows a cross-sectional view of a gasket which is being heat-welded according to the method of the exemplifying embodiment, coupled with a device for Injecting air according to one of the above defined steps.

Referring to FIG. 1 of the accompanying drawings, the reference numerals (10) and (11) show two lengths of profiles foe sealing gaskets of the type shown in particular in FIG. 7.

Such a gasket of FIG. 7 comprises a base element (12) designed for being used in order to fasten the gasket, for example to the counter-door piece of the refrigerator cabinet, a bellows-like extendible, or compressible, intermediate air chamber, and finally a front seat (14) designed to receive and house a magnetized material.

Going back to FIG. 1, both lengths of profile (10) and (11) are cut, at their respective ends (15) and (16), with an angle of 45°.

Both lengths of profile (10) and (11) are positioned, with said ends (15) and (16) being mutually opposite, inside the interior of a suitable heat-welding device constituted by a pair of fixed clamp jaws (17) and (18), designed to cooperate with a complementary pair of mobile clamp jaws (19) and (20).

Figure 2:
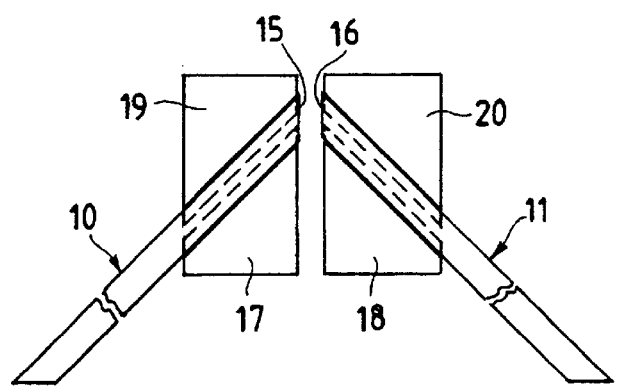
Figure 3:
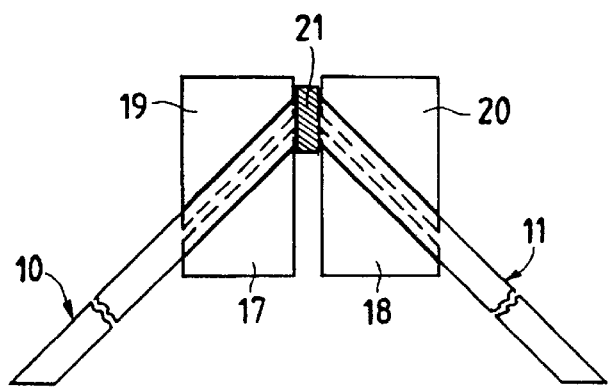

Once that both lengths of profile (10) and (11) are positioned as shown in FIG. 1, the mobile clamp jaws (19) and (20) are moved towards the fastened clamp jaws, until they come to their operating position as shown in FIG. 2.

The ends (15) and (16) of both lengths of profile are then heated by placing, between them, a heating element (21) until said ends of both lengths of profile reach a softened state.

Figure 4:
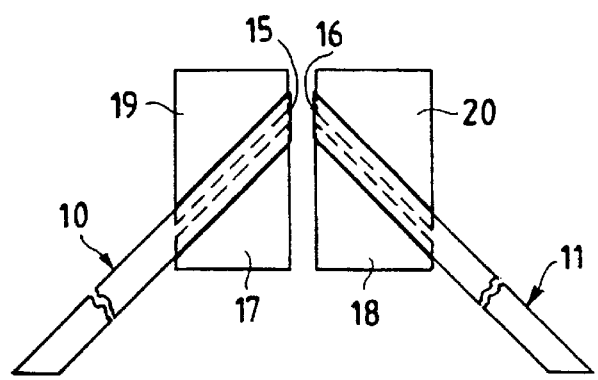

The heating element (21) is then removed as displayed in FIG. 4.

Figure 5:
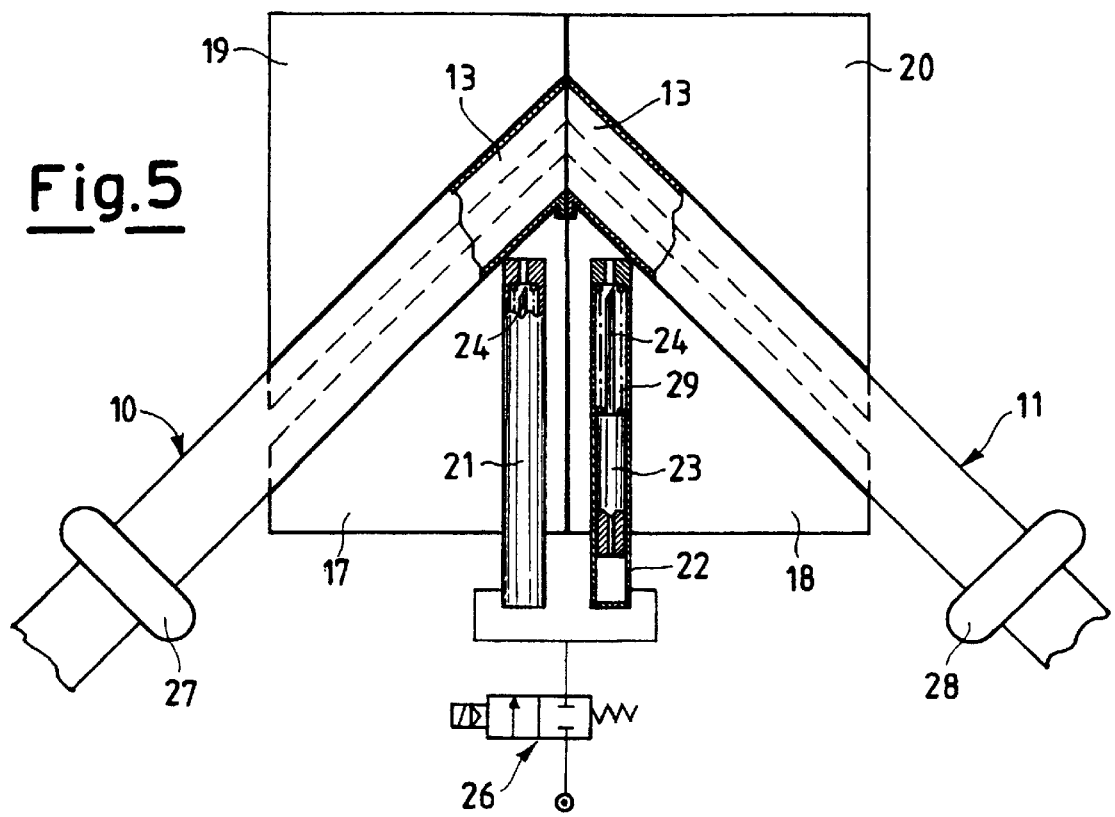

Finally, the heat-welding clamps are definitively clamped, as shown in FIG. 5, i.e., by closing said pairs of clamp jaws (17), (18) and (19), (20) so as to firmly lock both lengths of profile (10) and (11) inside the mould interior, as shown in FIG. 5.

In FIG. 5 there is displayed an air injecting device with which the fixed clamp jaws (17) and (18) are equipped.

In fact, longitudinally inside said clamp jaws and parallel to each other, two hollow cylinders (21) and (22) are provided inside each of which a respective piston (23) can slide which is equipped with a hollow needle (24) opened at its end (25) (see the detail of FIG. 7).

Each of said air injecting devices is controlled by a solenoid valve (26) which controls the compressed air injection into the interior of each of said cylinders (21) and (22). Air fed into the interior of the cylinders causes the piston (23) to istantaneously move forward and is discharged through the perforated tip (25) throughout the time during which the solenoid valve remains energized.

When the solenoid valve is de-energized, the piston with its needle returns back to its resting position, by being urged to return by a spring (29) provided inside the interior of the cylinder.

In such a way, the needle (24) borne by the piston (23), under the effect of pressure of injected air can extend outwards from the head of the cylinder (21) and (22), until it comes into contact with the side wall of the air chamber (13) of the gasket facing it in that position in which said profile for sealing gaskets is kept by the heat-welding mould.

Figure 6:
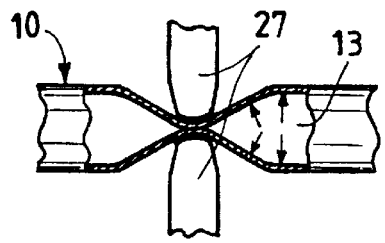
FIG. 6 shows a detail of FIG. 5, and finally

Going back to the position shown in FIG. 5, when the heat-welding mould is totally closed in order to cause both ends (15) and (16) of both lengths of profile to come into mutual mating contact, simultaneously with such position reaching, the solenoid valve (26) commands air to be injected through both cylinders (21) and (22) and the respective needles (24) to move forward, which are consequently pushed to extend outside from their seat until they come into contact with the side wall, and perforate the air chamber (13), of the profile for sealing gaskets, as schematically shown in FIG. 7. Compressed air is then injected through the bore of the hollow needle (24), through the opening (25), into the interior of said air chamber (13). Simultaneously, each of both lengths of profile (10) and (11) is choked at a cross-section thereof by means of the devices (27) and (28), as shown in particular in FIG. 6.

Such devices (27) and (28) can be constituted, for example, by cylindrical compressive means integral with pneumatic pistons which drive them automatically.

Compressed air injected into the interior of the air chamber (13) cannot therefore escape from said air chamber from the heat-welding area, because the internal bores of said profile for sealing gaskets are totally occluded at (27) and (28), and, as a consequence thereof, compressed air injected into the interior of the air chamber (13) by the needle (24) remains under pressure inside the region bounded by said choking section and said end of said length of profile, consequently applying a pressure to the walls of said lengths of profile in that region, pressing them against the walls of the clamping jaws.

In that way, while the heat-welding of both heated ends (15) and (16) of the lengths of profile is taking place, a pressure is simultaneously exerted from the interior of the air chamber of the profile for sealing gaskets, the effect of which will be of pushing both ends (15) and (16) against each other, as well as of exerting an expansion and consequently a compression of the walls of the profile for sealing gaskets against the walls of the heat-welding mould.

Pressurized air so fed to the air chamber performs the task of causing the walls of the profile for sealing gaskets to perfectly adhere to the wall of the clamps, thus considerably improving the mutual contact of the parts which must be heat-welded to each other during the heat-welding time.

We wish to remind that a further advantage is obtained thanks to the improved mutual adherence of those parts of both lengths of profile which must be heat-welded, associated with the normal formation of burr of material in the heat-welding area, which generally produces fins which must be removed.

The presence of compressed air injected from the outside according to the method of the present invention makes it possible such an excess of material, which otherwise would form such burrs, to be advantageously conveyed into the interior of a suitable groove provided along the inner angle of both lengths of profile of FIG. 5, between both fixed clamp jaws (17) and (18) which therefore acts as a suitable seat for receiving said material excess, so that at the inner angle of both so heat-welded lengths of profile a rib (30) of plastic material is formed which will act as a stiffening means of the profile frame in the angle in question, with a further reinforcement of the end effect of joining both said lengths of profile.

Air injection according to the method of the present invention offers a further advantage deriving from that it causes a fast cooling to take place of the parts heat-welded to each other, consequently allowing the heat-welding operation to be speeded up and offering the possibility of de-moulding more rapidly the heat-welded frame, with said frame being immediately handeable.

A further object of the present invention is a suitable apparatus for implementing the method disclosed hereinabove.

Such an apparatus comprises both the heat-welding mould with the relevant clamps as disclosed above, and the air injection device and the choking devices and, relatively to as disclosed in the preceding examples, it may comprise several variants capable of producing the same effect of pressurized air injection into the interior of the air chamber of the profile for sealing gaskets.

The method according to the present invention can then be further improved by applying a vacuum from outside of the heat-welding device, thus making it possible the lengths of profile to be positioned in an ideal way inside the interior of the same mould, because the effect of said vacuum is of causing said lengths of profile to adhere even better to the clamps, thus improving the static conditions of the system during the heat-welding operations and consequently the working precision.

The heat-welding method of the present invention is suitable for application to any suitable materials used for manufacturing gaskets for refrigerators and gaskets for other applications different from refrigeration industry, for example for motor vehicles, which may use, or less, magnetic effects, for example for such polymeric materials as PVC, or different from PVC.

What is claimed is:

1. Method for heat-welding corners of lengths of profiles together, for sealing gaskets, where said profiles comprise at least one extendible or compressible air chamber, said profiles being cut at their ends according to a suitable angle, said method comprising:

a) positioning two profiles, with one of the cut ends of each said profile opposite each other, inside a suitable device comprising clamps which make said positioning possible, b) heating said positioned ends until said positioned ends reach a softened state, c) choking said profiles so as to completely occlude said air chambers along choking sections, closing said clamps in order to cause said profiles to come into mutual mating contact at said heated ends, injecting air into said air chambers by perforating said air chambers in a region between the choking sections and the heated ends so as to apply pressure to walls of said profiles in that region, and pressing said walls against walls of the clamps, thus joining said heated ends by heat-welding under pressure, d) opening said occluded sections, e) heat-welding a cut free end of the heat-welded profiles with a third length of profile using steps a through d, and f) heat-welding a cut free end of the heat-welded profiles made in step e with a fourth length of profile using steps a through d so as to from a gasket frame which is heat-welded at its corners.

2. Method according to claim 1, characterized in wherein said cut angle of said profiles is 45°.

3. Method according to claim 1, wherein from the outside, vacuum is applied to said profiles positioned in said clamps.

4. Apparatus for heat-welding corners of lengths of profiles together, for sealing gaskets, where said profiles comprise at least one extendible or compressible air chamber, said profiles being cut at their ends according to a suitable angle, said apparatus comprises a heating element to heat one of the ends of each said profile clamps to position the profiles with the cut ends opposite each other and for mutually mating the heated ends together, needles for injecting air inside an interior of said air chambers nearby said ends to be heat-welded, and devices to choke said profiles by completely occluding said air chambers along choking sections.

5. Apparatus according to claim 4, wherein said needles are integral with a sliding piston inside a cylinder fed with compressed air by the action of a suitable control element, as a solenoid valve.

6. Apparatus according to claim 4, wherein said choking devices comprise cylindrical compressive means integral with pneumatic pistons which automatically control the operations thereof.

\* \* \* \* \*